United States Patent
Testin et al.

(10) Patent No.: US 8,531,611 B2
(45) Date of Patent: Sep. 10, 2013

(54) SYSTEM AND METHOD FOR POWER MANAGEMENT IN AN ELECTRONIC DEVICE

(75) Inventors: William John Testin, Indianapolis, IN (US); Mark Francis Rumreich, Indianapolis, IN (US)

(73) Assignee: Shenzhen TCL New Technology Ltd., Shenzhen, Guangdong (CN)

( * ) Notice: Subject to any disclaimer, the term of this patent is extended or adjusted under 35 U.S.C. 154(b) by 261 days.

(21) Appl. No.: 12/808,457

(22) PCT Filed: Feb. 22, 2008

(86) PCT No.: PCT/US2008/054707
§ 371 (c)(1),
(2), (4) Date: Jun. 16, 2010

(87) PCT Pub. No.: WO2009/082500
PCT Pub. Date: Jul. 2, 2009

(65) Prior Publication Data
US 2010/0302456 A1    Dec. 2, 2010

(30) Foreign Application Priority Data
Dec. 25, 2007    (CN) .......................... 2007 1 0125507

(51) Int. Cl.
*H04N 5/63*        (2006.01)

(52) U.S. Cl.
USPC ....................................................... 348/730

(58) Field of Classification Search
USPC ................. 348/706, 705, 730, 180, 725, 552, 348/553; 345/211, 212; 713/320; 710/156
See application file for complete search history.

(56) References Cited

U.S. PATENT DOCUMENTS

| | | | | |
|---|---|---|---|---|
| 5,659,371 | A | * | 8/1997 | Krause .......................... 348/730 |
| 6,119,239 | A | * | 9/2000 | Fujii ............................. 713/320 |
| 6,757,028 | B2 | | 6/2004 | Yamamoto |
| 7,317,495 | B2 | * | 1/2008 | Takahashi ..................... 348/838 |
| 2004/0153263 | A1 | * | 8/2004 | Holle .............................. 702/60 |
| 2006/0259803 | A1 | * | 11/2006 | Edwards et al. .............. 713/320 |
| 2007/0019115 | A1 | * | 1/2007 | Umeda .......................... 348/730 |
| 2010/0079595 | A1 | * | 4/2010 | Plut ............................... 348/180 |

FOREIGN PATENT DOCUMENTS

| | | |
|---|---|---|
| CN | 1925584 A | 3/2007 |
| JP | 2004-328020 A | 11/2004 |
| JP | 2005-191815 A | 7/2005 |
| KR | 2000-0028154 A | 5/2000 |
| KR | 2001-0011565 A | 2/2001 |
| WO | 2008/009366 A1 | 1/2008 |

OTHER PUBLICATIONS

Extended European Search Report for EP08730498.6, dated May 16, 2011; 7 pgs.

* cited by examiner

*Primary Examiner* — Paulos M Natnael
(74) *Attorney, Agent, or Firm* — Fletcher Yoder, P.C.

(57) ABSTRACT

There is provided a system and method for powering down particular circuits in an electronic device based on the usage habits of the user. An exemplary method comprises collecting usage data for a plurality of device functions of the electronic device, and reducing power consumption by circuitry associated with at least one of the plurality of device functions when the electronic device is in use if the usage data for the at least one of the plurality of device functions indicates that the at least one of the plurality of device functions is used less than at least another of the plurality of device functions.

19 Claims, 3 Drawing Sheets

SYSTEM AND METHOD FOR POWER MANAGEMENT IN AN ELECTRONIC DEVICE

FIELD OF THE INVENTION

The present invention relates generally to power management for electronic devices. More particularly, an exemplary embodiment of the present invention relates to conserving energy by powering down particular circuits in a digital television based on the usage habits of the consumer.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Due to increased expenses associated with providing energy and a desire to conserve natural resources, legislation and standards are being put in place to encourage improved energy efficiency. One example is the Energy Star Program, which provides standards for power consumption by electronic devices such as televisions and set top boxes. The Energy Star standard specifies requirements for operating modes called "Standby Power" and "Run Mode." Energy conservation is achieved by reducing or completely removing power from various device subsystems in Standby Power mode relative to Run Mode. Moreover, device systems that are not needed unless the device is being used by a user ("Run Mode") may be shut down in Standby Mode to conserve power.

In addition to saving power when devices are in Standby Mode, it is also desirable to reduce device power consumption in when operating in Run Mode. However, a number of obstacles make shutting down the operation of device subsystems during Run Mode undesirable. For example, if a user switches from an NTSC analog channel to an external video input like a DVD player, the TV tuner could potentially be turned off to save power because it is not necessary for the TV tuner video input to be processed and displayed on the screen. The drawback to turning off the tuner is that tuners require a relatively long period of time to become operational or "warm up" when power is reapplied. This means that the previously tuned channel will not be immediately available if the user switches back to the NTSC tuner from the DVD player. During the intervening time, the user is undesirably subjected to viewing a "blanked" display. This problem is particularly pronounced with the viewing of digital channels because the process of acquiring a valid "I Frame" on a digital channel may take several seconds, resulting in a much longer "blanked" time that could be annoying to users. An improved system and method for providing reduced power consumption for an electronic device that is being used for normal operation is desirable.

BRIEF DESCRIPTION OF THE DRAWINGS

Advantages of the invention may become apparent upon reading the following detailed description and upon reference to the drawings in which.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

It should also be noted that the use or depiction of a particular video format is intended for convenience only and should not be construed as a limitation of the present invention. Persons of ordinary skill in the art will recognize that exemplary embodiments of the present method and device can be implemented with any audio, visual or data format and with any number of input tuners or front end circuits adapted to receive an audio, visual or data signal.

An exemplary embodiment of the present invention monitors various device functions and makes determinations about when circuitry associated with particular device functions may be turned off during normal full-power operation of an electronic device. The decision about when to remove power from a device subsystem is based on a determination that the particular functionality is unlikely to be used by a user based on the user's past usage pattern. The specific examples of device functionality set forth herein relate to removing power from tuners in a television based on a likelihood that a user will not use a particular tuner as an input source. Those of ordinary skill in the art will appreciate that circuitry associated with other device functions (besides tuning an input signal) may be powered down in a similar manner. By way of example, an exemplary embodiment of the present invention may monitor the number of times a user employs a personal video recorder (PVR) function and reduce or remove power from the circuitry supporting the PVR function if it is unlikely that a user will use that function.

Figure 1:
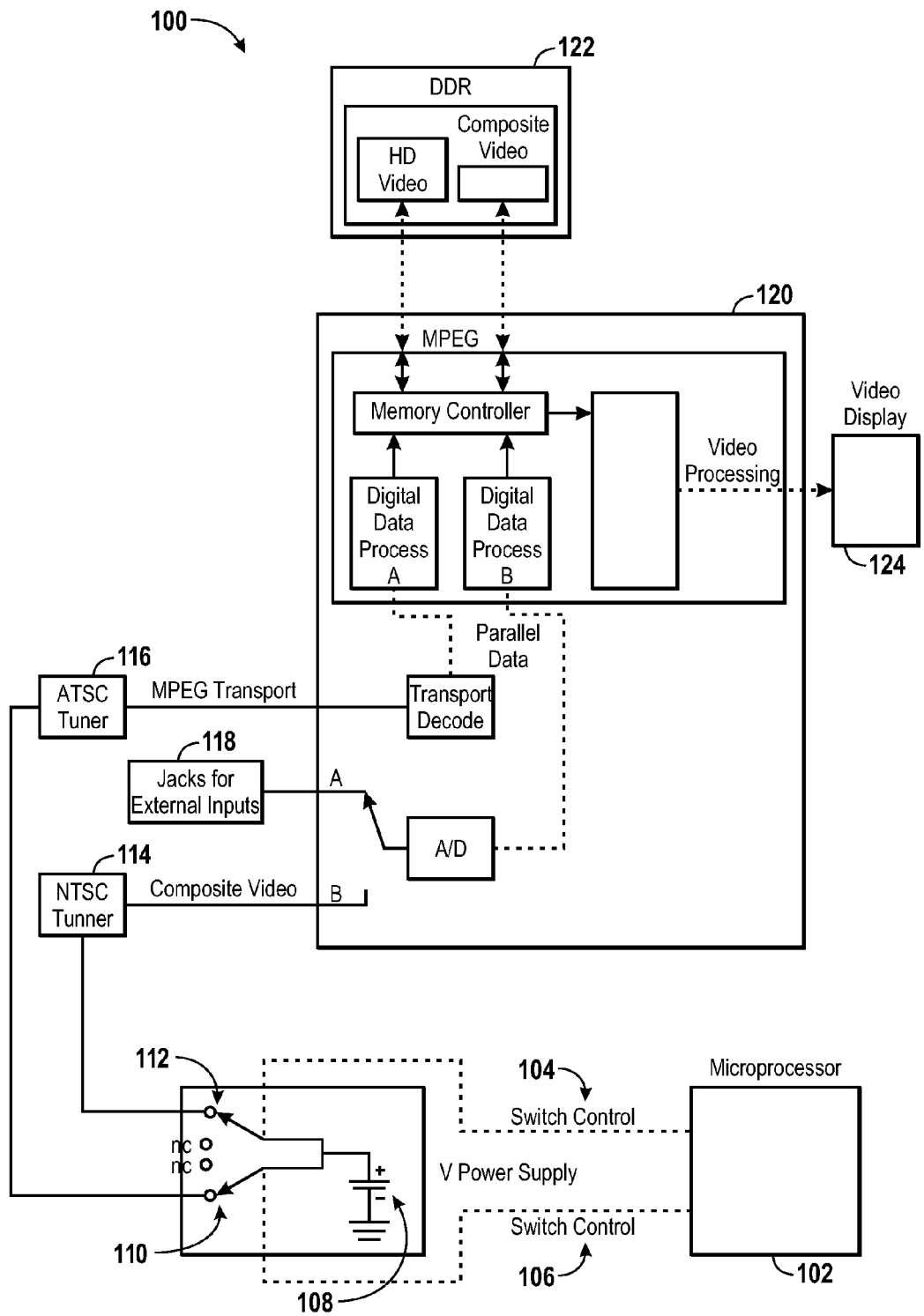
FIG. 1 is a block diagram of an electronic device in accordance with an exemplary embodiment of the present invention.

FIG. 1 is a block diagram of an electronic device in accordance with an exemplary embodiment of the present invention. The electronic device is generally indicated by reference numeral 100. Specifically, the electronic device 100 includes a microprocessor 102, tuner switch controls 104 and 106, a power supply 108, tuner switches 110 and 112, an NTSC tuner 114, an ATSC tuner 116, an external input 118, a data processor 120, a digital data recorder 122 and a video display 124. In the exemplary embodiment shown, the data processor 120 is configured to receive data from the ATSC tuner 116, the NTSC tuner 114 or optionally from the external input 118, which is typically connected to an external source such as, for example, a cable box or DVD player. External input 118 can be configured to accept any TV video input format such as, for example, HDMI, YPrPb and SVHS. The electronic device 100 can also be configured to include a plurality of external inputs.

The electronic device 100 includes video switching logic (not shown), which allows the user to switch between various input sources, i.e., to switch between programs provided via the ATSC tuner 116, the NTSC tuner 114 or the external input 118. The microprocessor 102 may include a video switching state machine electrically coupled to the video switching circuitry so that microprocessor 102 can collect usage data regarding the user selected input sources. For example, in one exemplary embodiment, microprocessor 102 counts the number of times that the user switches to each particular input source. In this way, a record can be compiled showing how often a particular input source is selected.

In another exemplary embodiment, the microprocessor 102 includes or is coupled to an electronic timer (not shown) that allows the microprocessor to pair input source data or other data related to device functionality with time data (e.g., the amount of time each input source is selected). For example, each time the user switches to a different input source, the microprocessor 102 may store data comprising the input source selected by the user and the time at which the input source was selected. In this way, a record can be compiled showing the length of time each input source is used by the user.

In yet another exemplary embodiment, the microprocessor 102 associates a video switching state with instances of television usage. In other words, each time the television is turned on or otherwise put into Run Mode operation (as opposed to Standby Mode operation), a counter is incremented by the microprocessor, and this counter value is stored along with the switching state (input source) that is selected when the television is turned on. Additionally, each time a different switching state is selected by the user, the microprocessor stores the counter value and switching state. This provides a log of video switching state activity that is associated with particular instances of television usage.

The NTSC tuner 114 and ATSC tuner 116 are connected to a power supply 108 through switches 112 and 110 respectively. The switches 110 and 112 are electrically coupled to the microprocessor 102, such that the microprocessor 102 can open or close the switches via switch control outputs 104 and 106. In the exemplary embodiment shown, the switches 110 and 112 are normally closed. As discussed in greater detail below, the switches 110 and 112 can also be adapted to operate in a normally open configuration.

The microprocessor 102 can manage power consumption of the electronic device 100 by evaluating the collected usage data and powering down NTSC tuner 114 or ATSC tuner 116 or both or neither, based on the accumulated usage data. For example, if the usage data collected by microprocessor 102 indicates that the user rarely selects NTSC tuner 114, the microprocessor 102 can reduce power consumed by the NTSC tuner 114. In an exemplary embodiment of the present invention, power consumed by the NTSC tuner 114 is reduced by applying a control signal to switch control 104 which decouples the NTSC tuner 114 from the power supply 108. In this manner, the NTSC tuner 114 is powered down even when the electronic device 100 is operating in Run Mode and is being used by a user. This determination is based on the fact that the user has rarely selected the NTSC tuner as an input source, and is therefore less likely to select the NTSC tuner as the input source at any given time. Additionally, if updated usage data indicates that NTSC tuner 114 is no longer infrequently selected, microprocessor 102 can apply a control signal to the switch control 104 to re-couple the NTSC tuner 114 to power supply 108, thereby powering up NTSC tuner 114 in Run Mode, even when not in use. This determination would be based on the assumption that the user is likely to switch to the NTSC tuner 114 as an input and would be annoyed by a lengthy delay in which the NTSC tuner 114 warms up before it is able to provide a display.

In one exemplary embodiment, microprocessor 102 controls the switches 110 and 112 according to the length of time that each input is used. For example, if the microprocessor calculates (after an initial "learning" period) that the ATSC tuner is used a majority of the time, the microprocessor will keep switch 110 turned on even when the television is not displaying the ATSC program. Alternatively, if the microprocessor calculates that the external input is used a majority of the time, as may happen if the user has the external input 118 connected to a cable box, then the microprocessor 102 would turn off the switches 110 and 112 so that both the ATSC and the NTSC tuners are turned off, even when the electronic device is in the Run Mode and being used by a user to view a program being received via the external input 118.

In another exemplary embodiment, microprocessor 102 controls the switches 110 and 112 according to whether a particular tuner has been used within a certain number of times that the television has been turned on (or put into Run Mode operation as opposed to Standby Mode). If, for example, a particular tuner has not been selected during the previous twenty times that the television was turned on, the microprocessor 102 would turn off the switch corresponding to that particular tuner. If that particular tuner were subsequently selected, then microprocessor 102 would turn the corresponding switch back on so that the tuner is powered up in Run Mode, even though the tuner is not presently in use.

It should be noted that tuners 114 and 116 are always coupled to power supply 108 when specifically selected by the user through the video switching circuitry. For example, microprocessor 102 could be programmed to turn on the selected tuner through the appropriate switch 110 or 112 when that particular tuner is selected by the user as the desired input source. Alternatively, additional switches controlled by the video switching circuitry (not shown) rather than microprocessor 102 are electrically coupled in parallel to switches 110 and 112. In this way, the switches 110 and 112 can be bypassed when necessary to provide power to tuners 114 and 116.

Those of ordinary skill in the art will appreciate that power consumption by circuitry associated with particular device functionality may be reduced even though power is not completely removed from the circuitry. For example, power consumption may be reduced by placing specific circuitry associated with a particular device function in a multi-function integrated circuit device into a low power mode of operation or by removing a clock input signal from the circuitry, for example.

Figure 2:
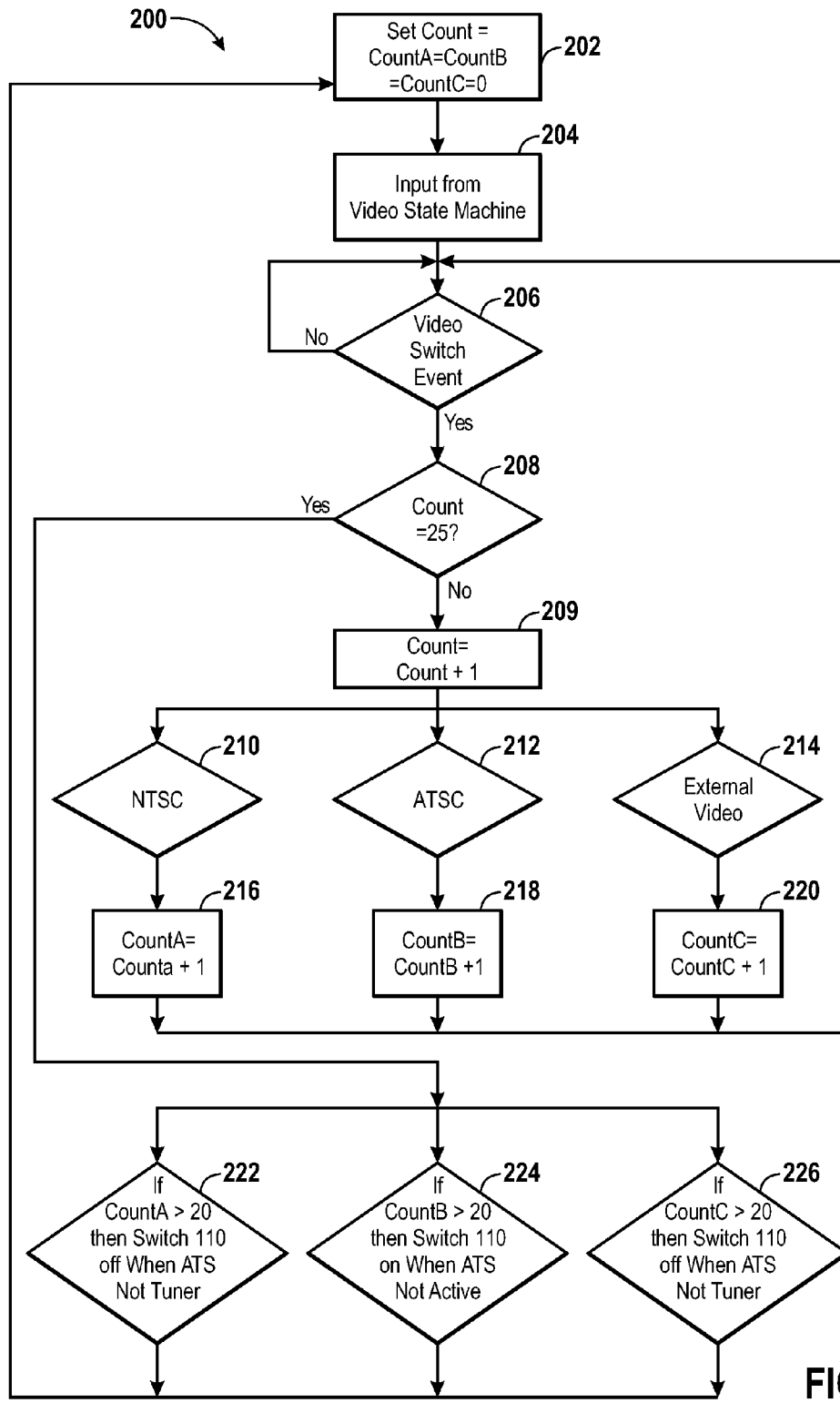
FIG. 2 is a process flow diagram of a process for collecting usage data in accordance with an exemplary embodiment of the present invention.

FIG. 2 is a process flow diagram of a process in accordance with an exemplary embodiment of the present invention. The process is generally designated by reference numeral 200. The process 200 is an exemplary procedure for controlling power management of an ATSC tuner in a digital television. While the procedure for only an ATSC tuner is shown, it will be appreciated by those of ordinary skill in the art that the same procedure can be substantially duplicated for power management of an NTSC tuner, as well as circuitry related to other device functions. It is also important to note that specific comparison integers are shown in the process 200 by way of illustration only and should not be construed as limiting the scope of the present invention.

The process 200 starts at block 202, in which variables Count, CountA, CountB and CountC are set to zero. Process 200 then proceeds to monitor the input from a video state machine, as shown at block 204. In an exemplary embodiment of the present invention, the video state machine is implemented using the processor 102 (FIG. 1).

If a video switch event (i.e., a change in source input by the user) or other change to a device function is detected at block 206, the variable "Count" is compared to a threshold integer value (block 208). Specifically, if Count is not yet equal to a threshold value corresponding to a required amount of usage data (e.g., twenty-five), Count is incremented by one (block 209), and subsequently, one of the variables "CountA" (Step 216), "CountB" (Step 218) or "CountC" (Step 220) is also incremented by one, depending on whether the user has selected NTSC, ATSC or external video input, respectively. Moreover, the variables CountA, CountB and CountC each respectively represent the number of times a particular source input is selected by the user. In the exemplary embodiment illustrated in FIG. 2, CountA corresponds to the NTSC tuner 114 (FIG. 1), CountB corresponds to the ATSC tuner 116 (FIG. 1) and CountC corresponds to the external input 118 (FIG. 1). Subsequently, the process 200 returns to block 206 to monitor the input from the video state machine.

Alternatively, at block 208, if Count does equal the threshold value, the process 200 proceeds to determine the required state of switch 110 (FIG. 1). Particularly, if CountA or CountC is greater than a second threshold value (e.g., twenty), then switch 110 (FIG. 1) is switched off so that the ATSC tuner is powered down even though the electronic device 100 is in Run Mode and is being used by the user. Alternatively, if CountB is greater than twenty, then switch 110 is switched on so that the ATSC tuner continues to be powered in Run Mode, even though the ATSC tuner is not currently selected by the user (block 224). After setting the switch 110, the variables Count, CountA, CountB, and CountC are set to zero (block 202), and the process returns to block 206 to monitor the input from the video state machine. The result of the process 200 is that the ATSC tuner 116 (FIG. 1) will be turned off during Run Mode after twenty five switching events if either the NTSC tuner or the external input has been selected in more than twenty of the previous twenty five video switching events.

In an alternative embodiment, the variables Count, CountA, CountB and CountC are not set to zero as shown at block 202. Instead, a running total for all variables is maintained, but only a specified number of the most recent changes are considered in determining whether to remove the power from circuitry associated with a given device function when the electronic device 100 (FIG. 1) is running and being used by the user.

Before the electronic device 100 (FIG. 1) has been operated for a length of time sufficient for the collection of the required usage data, the microprocessor 102 (FIG. 1) will engage a default switch mode. In many cases, it will be desirable for the default switch mode to supply full operating power to all of the circuitry (all switches normally closed). Supplying full power to all circuits within this initial "learning" period, will prevent excessive screen blanking during the initial learning period, but will also result in higher power consumption. In order to conserve power during the initial learning period while still preventing excessive screen blanking, a default switch mode could be employed which would anticipate the probable usage characteristics of an anticipated user. For example, it might be anticipated that users of digital televisions will more frequently utilize the ATSC tuner; therefore, a digital television employing the present invention could be configured with a default switch mode that includes turning off the NTSC tuner 114 (FIG. 1) when it is not in use (i.e., in which switch 112 (FIG. 1) is normally open).

Figure 3:
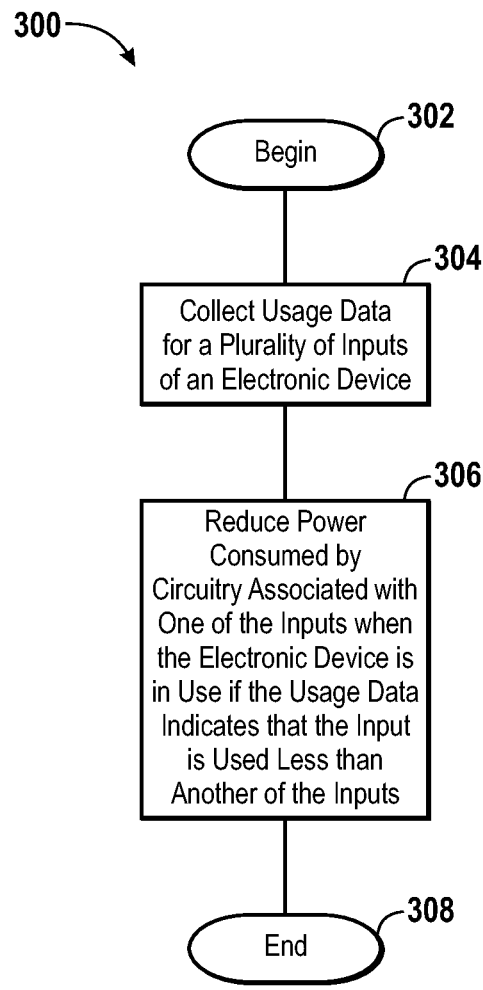
FIG. 3 is a process flow diagram of a process for power management in accordance with an exemplary embodiment of the present invention.

FIG. 3 is a process flow diagram of a process for power management in accordance with an exemplary embodiment of the present invention. The process is generally designated by reference numeral 300. At block 302, the process begins.

At block 304, usage data is collected for a plurality of device functions of an electronic device. This usage data may be collected by the processor 102 (FIG. 1) of an electronic device such as the electronic device 100 (FIG. 1). Indeed, the usage data may be collected by the process described above with reference to FIG. 2.

At block 306, the usage data is evaluated and power is removed from circuitry associated with a one of the plurality device functions when the electronic device is running (in use) if the usage data indicates that the one of the plurality of device functions is used less than at least another of the plurality of user device functions. Moreover, an exemplary embodiment of the present invention allows conservation of power by an electronic device even if the electronic device is fully operational (e.g., in Energy Star Run Mode) based on particular usage patterns of the user of the electronic device. The process ends at block 308.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of operating a television, comprising:
collecting usage data for a plurality of device functions of the television by using a processor to monitor input source selection during operation of the television;
comparing the collected usage data for each of the plurality of device functions; and
reducing power consumption by circuitry associated with at least one of the plurality of device functions while the television is in use when comparing the collected usage data indicates that the at least one of the plurality of device functions is used less than at least another of the plurality of device functions.

2. The method of claim 1, wherein the usage data comprises an amount of time each of the plurality of device functions is used by the user.

3. The method of claim 1, wherein the usage data comprises a number of times each of the plurality of device functions is accessed by the user.

4. The method of claim 1, wherein the usage data comprises a number of times that the television has been powered up.

5. The method of claim 1, wherein power is removed from the circuitry associated with the at least one of the plurality of device functions when the television is in a particular mode of operation.

6. The method of claim 5, wherein the particular mode of operation is an Energy Star Run Mode.

7. The method of claim 1, wherein the circuitry associated with the at least one of the plurality of inputs comprises a signal tuner.

8. The method of claim 1, wherein the plurality of device functions each comprises tuning an input signal from a different input source.

9. The method of claim 1, wherein collecting usage data comprises electronically monitoring a video switching state machine.

10. The method of claim 1, wherein the step of reducing power consumption is automatically repeated each time a required amount of the usage data is collected.

11. The method of claim 1, wherein the step of reducing power consumption occurs after the expiration of a specified time.

12. The method of claim 1, wherein the step of reducing power consumption occurs after a specified number of video switching events.

13. The method of claim 1, wherein the step of reducing power consumption occurs after a specified number of times that the television is powered up.

14. A television that performs a plurality of device functions, the television comprising:
   circuitry associated with each of the plurality of device functions; and
   a processor that is adapted to collect usage data for each of the plurality of device functions via monitoring of input source selection during operation of the television, to compare the collected usage data for the plurality of device functions, and to reduce power consumption by circuitry associated with at least one of the plurality of device functions while the television is in use when comparison of the collected usage data indicates that the at least one of the plurality of device functions is used less than at least another of the plurality of device functions.

15. The television of claim 14, wherein the circuitry associated with the at least one of the plurality of device functions comprises a signal tuner.

16. The television of claim 14, wherein the circuitry associated with the at least one of the plurality of device functions comprises a digital signal tuner.

17. The television of claim 14, wherein the plurality of device functions each comprises tuning an input signal from a different input source.

18. The device of claim 14, further comprising a video switching state machine, wherein the processor is adapted to collect the usage data by monitoring the video switching state machine.

19. A television, comprising:
   means for collecting usage data for a plurality of device functions of the television by monitoring input source selection during operation of the television; and
   means for comparing the collected usage data and reducing power consumption by circuitry associated with at least one of the plurality of device functions while the television is in use when comparing the collected usage data indicates that the at least one of the plurality of device functions is used less than at least another of the plurality of device functions.

* * * * *